US012657533B2

(12) United States Patent
Werner et al.

(10) Patent No.: US 12,657,533 B2
(45) Date of Patent: Jun. 16, 2026

(54) PERSONALIZED ARTIFICIAL INTELLIGENCE BREAK SCHEDULER

(71) Applicant: International Business Machines Corporation, Armonk, NY (US)

(72) Inventors: John S. Werner, Fishkill, NY (US); Jonah Hendler, Roslyn, NY (US); Jesus Francisco Alvarado-Garcia, Poughkeepsie, NY (US); Mark A Check, Hopewell Junction, NY (US); Jon Fronckowiak, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 140 days.

(21) Appl. No.: 18/492,052

(22) Filed: Oct. 23, 2023

(65) Prior Publication Data

US 2025/0131351 A1    Apr. 24, 2025

(51) Int. Cl.
G06Q 10/00          (2026.01)
G06Q 10/0631        (2023.01)
G06Q 10/1093        (2023.01)

(52) U.S. Cl.
CPC . G06Q 10/063114 (2013.01); G06Q 10/1093 (2013.01)

(58) Field of Classification Search
None
See application file for complete search history.

(56) References Cited

U.S. PATENT DOCUMENTS

| | | | |
|---|---|---|---|
| 8,652,041 B2 | 2/2014 | Moore-Ede | |
| 9,971,340 B1 | 5/2018 | Labrosse | |
| 11,210,611 B2 | 12/2021 | Kamen | |
| 11,355,247 B2 | 6/2022 | Saliman | |

(Continued)

FOREIGN PATENT DOCUMENTS

| | | | |
|---|---|---|---|
| CN | 111091694 A | 5/2020 | |
| CN | 114066259 A | 2/2022 | |
| JP | 7250647 B2 * | 4/2023 | |

OTHER PUBLICATIONS

Matuz, A., van der Linden, D., Darnai, G. et al. Generalisable machine learning models trained on heart rate variability data to predict mental fatigue. Sci Rep 12, 20023 (2022). (Year: 2022).*

(Continued)

*Primary Examiner* — Matheus Ribeiro Stivaletti
(74) *Attorney, Agent, or Firm* — Michael O'Keefe

(57)                ABSTRACT

According to one embodiment, a method, computer system, and computer program product for personalized artificial intelligence (AI) break scheduling is provided. The embodiment may include monitoring a calendar associated with a user and input data from the user during a block of one or more meetings. The embodiment may also include generating a fatigue array based on the calendar and input data. The embodiment may further include comparing the fatigue array to a user profile associated with the user. The embodiment may also include performing an action based on a correlation between the calendar or fatigue array and user profile exceeding a threshold. The embodiment may also include updating the user profile to include the fatigue array.

18 Claims, 3 Drawing Sheets

(56) References Cited

U.S. PATENT DOCUMENTS

| 11,387,000 | B2 | 7/2022 | Saliman | |
| 2019/0228367 | A1* | 7/2019 | Longo | G06Q 10/063112 |
| 2019/0334907 | A1 | 10/2019 | Rodden | |
| 2021/0110894 | A1* | 4/2021 | Shriberg | G16H 50/50 |
| 2021/0291839 | A1* | 9/2021 | Hutchings | A61B 5/18 |
| 2023/0360161 | A1* | 11/2023 | Dixit J | G06Q 50/265 |
| 2024/0161046 | A1* | 5/2024 | Thakur | G06Q 10/06398 |

OTHER PUBLICATIONS

Authors et al.: Disclosed Anonymously, "Advancing Patient-Centric Care for the Mentally Disabled", An IP.com Prior Art Database Technical Disclosure, IP.com No. IPCOM000268680D, IP.com Electronic Publication Date: Feb. 15, 2022, 8 Pages.
Authors et al.: Disclosed Anonymously, "Automated Personalized Dietary Health Improvement and Maintenance through Multiple Factor Analytics", An IP.com Prior Art Database Technical Disclosure, IP.com No. IPCOM000262989D, IP.com Electronic Publication Date: Jul. 20, 2020, 5 Pages.
Authors et al.: Disclosed Anonymously, "Method for Collection and Analysis of Data to Determine the Ranked Prescriptive Path for Emotional Support of Memory Care Patients", An IP.com Prior Art Database Technical Disclosure, IP.com No. IPCOM000264772D, IP.com Electronic Publication Date: Jan. 25, 2021, 7 Pages.
Authors et al.: Disclosed Anonymously, "Personal Mental Health Monitor", An IP.com Prior Art Database Technical Disclosure, IP.com No. IPCOM000268779D, IP.com Electronic Publication Date: Feb. 25, 2022, 4 Pages.
Boucher et al., "Artificially Intelligent Chatbots in Digital Mental Health Interventions: A Review", Expert Review of Medical Devices, vol. 18, Issue: Sup 1, Dec. 31, 2021, 14 Pages.
Debara, Deanna, "4 Reasons Taking Breaks is Beneficial to Your Productivity", Integrify, Mar. 30, 2021, 9 Pages.
Divincenzo, Kimber, "How Effective Breaks at Work Increase Productivity", Work-Ffit, Aug. 18, 2020, 6 Pages.
Graham et al., "Artificial Intelligence for Mental Health and Mental Illnesses: An Overview", Current Psychiatry Reports 21(11), Nov. 2020, 26 Pages.
Ramachandran, Vignesh, "Stanford researchers identify four causes for 'Zoom fatigue' and their simple fixes", Stanford Report, Stanford University, Feb. 23, 2021, 5 Pages.
Su et al., "Deep Learning in Mental Health Outcome Research: A Scoping Review", Translational Psychiatry 10:116, 2020, 26 Pages.

* cited by examiner

100

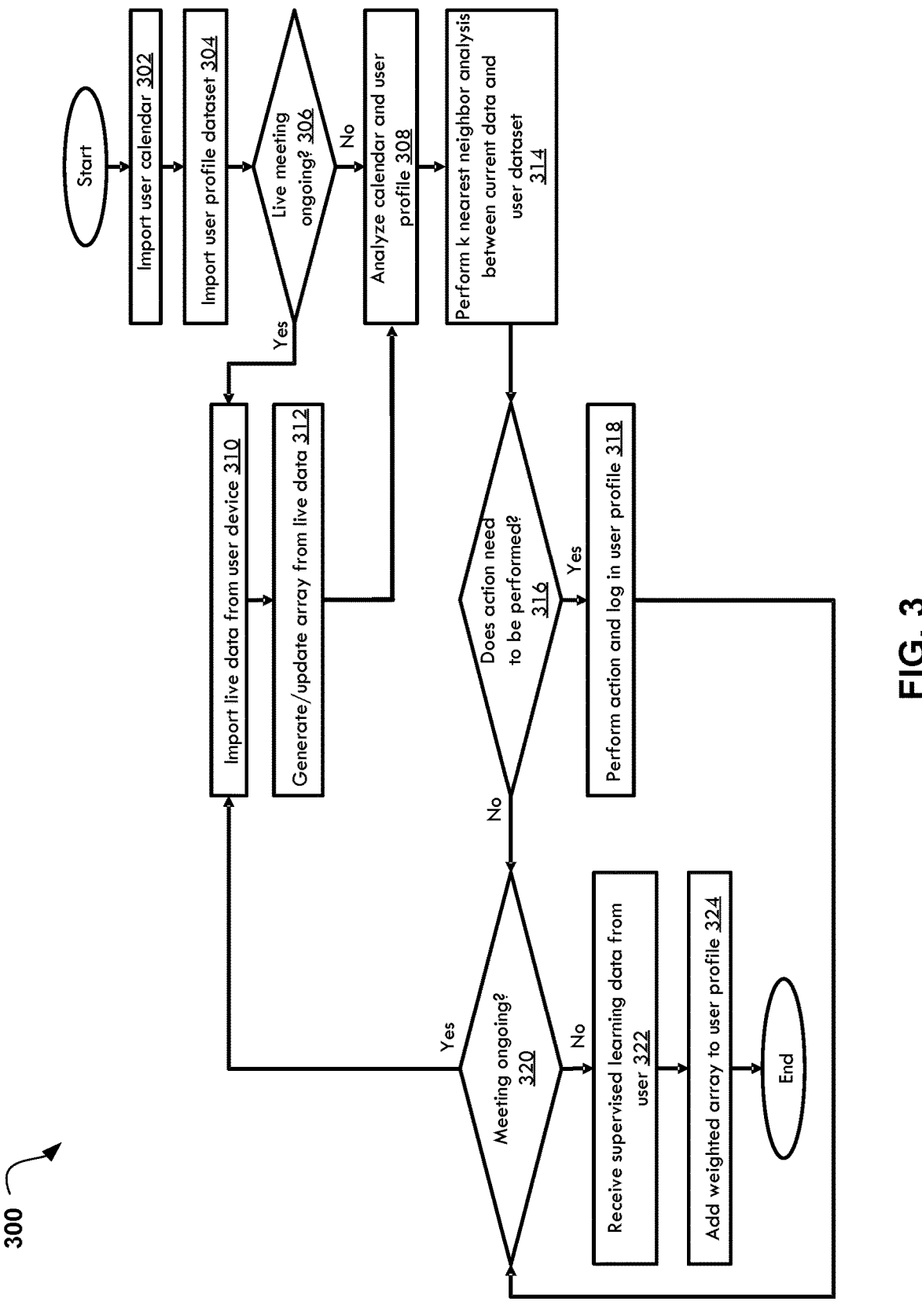

300

Start

Import user calendar 302

Import user profile dataset 304

Live meeting ongoing? 306

Yes

No

Import live data from user device 310

Generate/update array from live data 312

Analyze calendar and user profile 308

Perform k nearest neighbor analysis between current data and user dataset 314

Does action need to be performed? 316

No

Yes

Perform action and log in user profile 318

Meeting ongoing? 320

Yes

No

Receive supervised learning data from user 322

Add weighted array to user profile 324

End

FIG. 3

PERSONALIZED ARTIFICIAL INTELLIGENCE BREAK SCHEDULER

BACKGROUND

The present invention relates generally to the field of computing, and more particularly to fatigue assessment.

Fatigue may relate to a feeling of tiredness and/or exhaustion that can be constant under the right circumstances. Fatigue may appear in various forms including physical, mental, or a combination of both. Causes of fatigue can include various issues such as, but not limited to, lifestyle, social, psychological, and general wellbeing issues and might not be related to any specific underlying medical condition. When not related to an underlying medical condition, fatigue may be alleviated through sleep, healthy eating habits, and regular exercise.

Different areas of an individual's life may be affected by and cause fatigue. For example, lifestyle fatigue may be a result of a lack of sleep, too much sleep, alcohol, medications, sleep disturbances, lack of regular exercise, sedentary behavior, and/or poor diet. Similarly, workplace-related fatigue may be a result of changes in working on different/ irregular shifts, poor workplace practices, workplace stress, burnout, and unemployment.

SUMMARY

According to one embodiment, a method, computer system, and computer program product for personalized artificial intelligence (AI) break scheduling is provided. The embodiment may include monitoring a calendar associated with a user and input data from the user during a block of one or more meetings. The embodiment may also include generating a fatigue array based on the calendar and input data. The embodiment may further include comparing the fatigue array to a user profile associated with the user. The embodiment may also include performing an action based on a correlation between the calendar or fatigue array and user profile exceeding a threshold. The embodiment may also include updating the user profile to include the fatigue array.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIG. 3 illustrates an operational flowchart for a personalized AI break scheduling process according to at least one embodiment.

DETAILED DESCRIPTION

Figure 1:
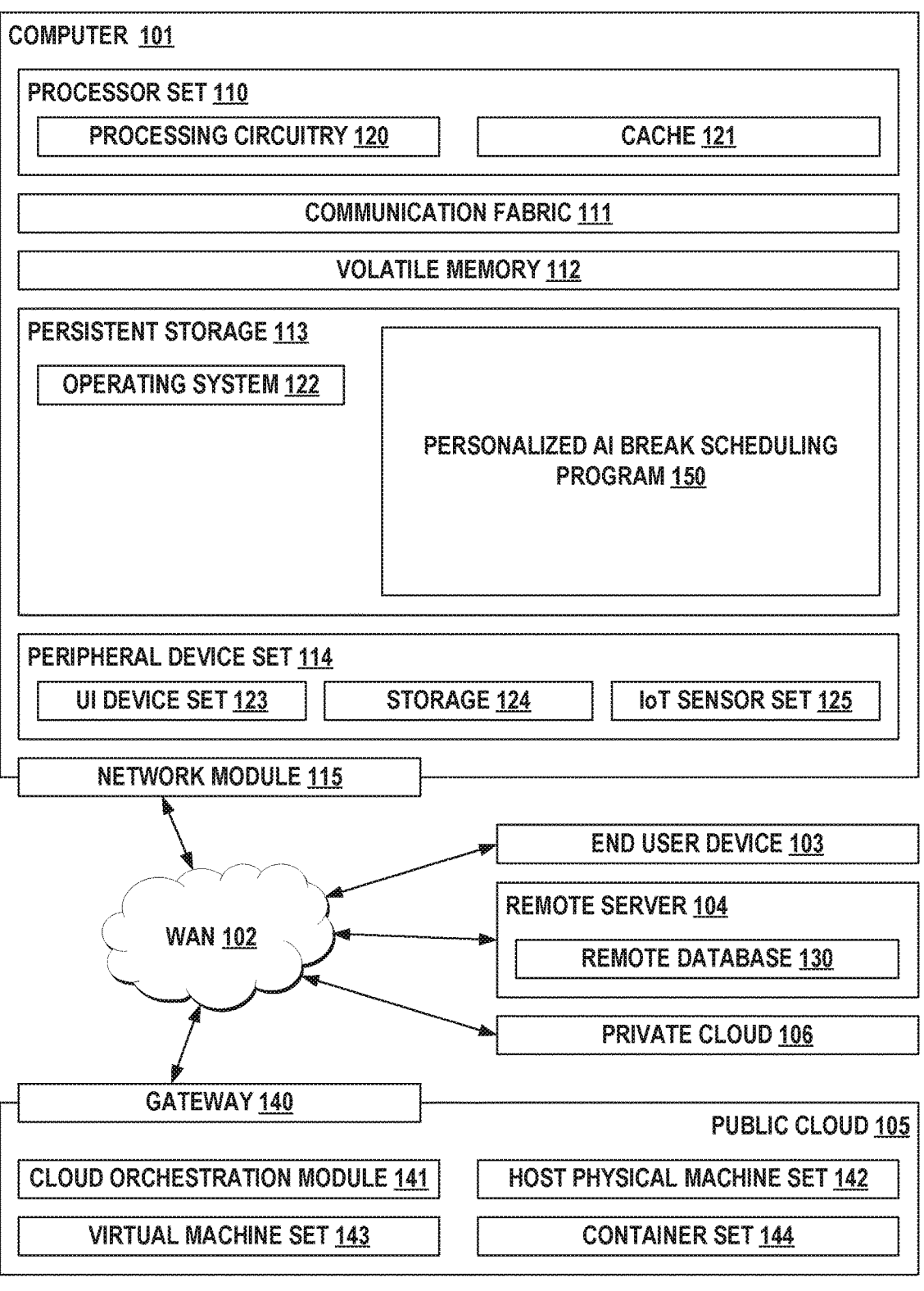
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention relate to the field of computing, and more particularly to fatigue assessment. The following described exemplary embodiments provide a system, method, and program product to, among other things, track user fatigue over time in blocks of meetings with no break in between. Therefore, the present embodiment has the capacity to improve the technical field of fatigue assessment by increasing user physical and mental wellbeing and focus through systematic break scheduling based on a user's individual needs.

As previously described, fatigue may relate to a feeling of tiredness and/or exhaustion that can be constant under the right circumstances. Fatigue may appear in various forms including physical, mental, or a combination of both. Causes of fatigue can include various issues such as, but not limited to, lifestyle, social, psychological, and general wellbeing issues and might not be related to any specific underlying medical condition. When not related to an underlying medical condition, fatigue may be alleviated through sleep, healthy eating habits, and regular exercise.

Different areas of an individual's life may be affected by and cause fatigue. For example, lifestyle fatigue may be a result of a lack of sleep, too much sleep, alcohol, medications, sleep disturbances, lack of regular exercise, sedentary behavior, and poor diet. Similarly, workplace-related fatigue may be a result of changes in working on different shifts, poor workplace practices, workplace stress, burnout, and unemployment.

Workers are included in many meetings and other activities throughout the workday and, as such, it is common that large blocks of time become filled with meetings that run back-to-back or assignments that leave little to no time in between. Furthermore, with many meetings shifting to virtual communications, additional screen time with no breaks may exacerbate certain issues, such as eye fatigue, and further impact an individual's mental and physical health in a negative manner that decreases focus, concentration, and productivity. Taking breaks can be beneficial to an individual's mental and physical health, increase focus, increase concentration, and improve productivity. However, every individual has different needs based on their specific circumstances, such as, but not limited to, age and physical abilities, that may require more breaks than others resulting in the inevitable failure of a fixed rule for allocating breaks. As such, it may be advantageous to, among other things, implement a system that tracks user fatigue over time and, based on individual user characteristics and needs, schedules breaks into a user's calendar.

According to at least one embodiment, an action suggestion program may utilize artificial intelligence techniques to learn user fatigue metrics over time that are specific to an individual user such that automatic breaks can be added to a user's calendar when similar patterns are observed for future meetings, activities, or interactions. By adding breaks to a user's calendar before larger blocks of meetings accumulate, the action suggestion program may improve a user's mental and physical health such that they can be more focused and more productive in meetings and activities since the individual did not have as many large blocks of back-to-back meetings, activities, and/or interactions.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring now to FIG. 1, computing environment 100 contains an example of an environment for the execution of at least some of the computer code involved in performing the inventive methods, such as personalized AI break scheduling program 150. In addition to personalized AI break scheduling program 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and personalized AI break scheduling program 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer, or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, for illustrative brevity. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in personalized AI break scheduling program 150 in persistent storage 113.

Communication fabric 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in personalized AI break scheduling program 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN 102 and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community, or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

According to at least one embodiment, the personalized AI break scheduling program 150 may generate a user profile that incorporates various user-specific characteristics and user calendar items, generate a suggested action for the user based on the user profile, and present the suggested action to the user through a push notification or a pop-up notification on a graphical user interface. The personalized AI break scheduling program 150 may be utilized with various forms of live meetings including, but not limited to, live, in-person meetings, and web conferences conducted virtually using a web conferencing application.

Additionally, prior to initially performing any actions, the personalized AI break scheduling program 150 may perform an opt-in procedure. The opt-in procedure may include a notification of the data the personalized AI break scheduling program 150 may capture and the purpose for which that data may be utilized by the personalized AI break scheduling program 150 during data gathering and operation. Furthermore, notwithstanding depiction in computer 101, the personalized AI break scheduling program 150 may be stored in and/or executed by, individually or in any combination, end user device 103, remote server 104, public cloud 105, and private cloud 106. The action suggestion method is explained in more detail below with respect to FIGS. 2-3.

Figure 2:
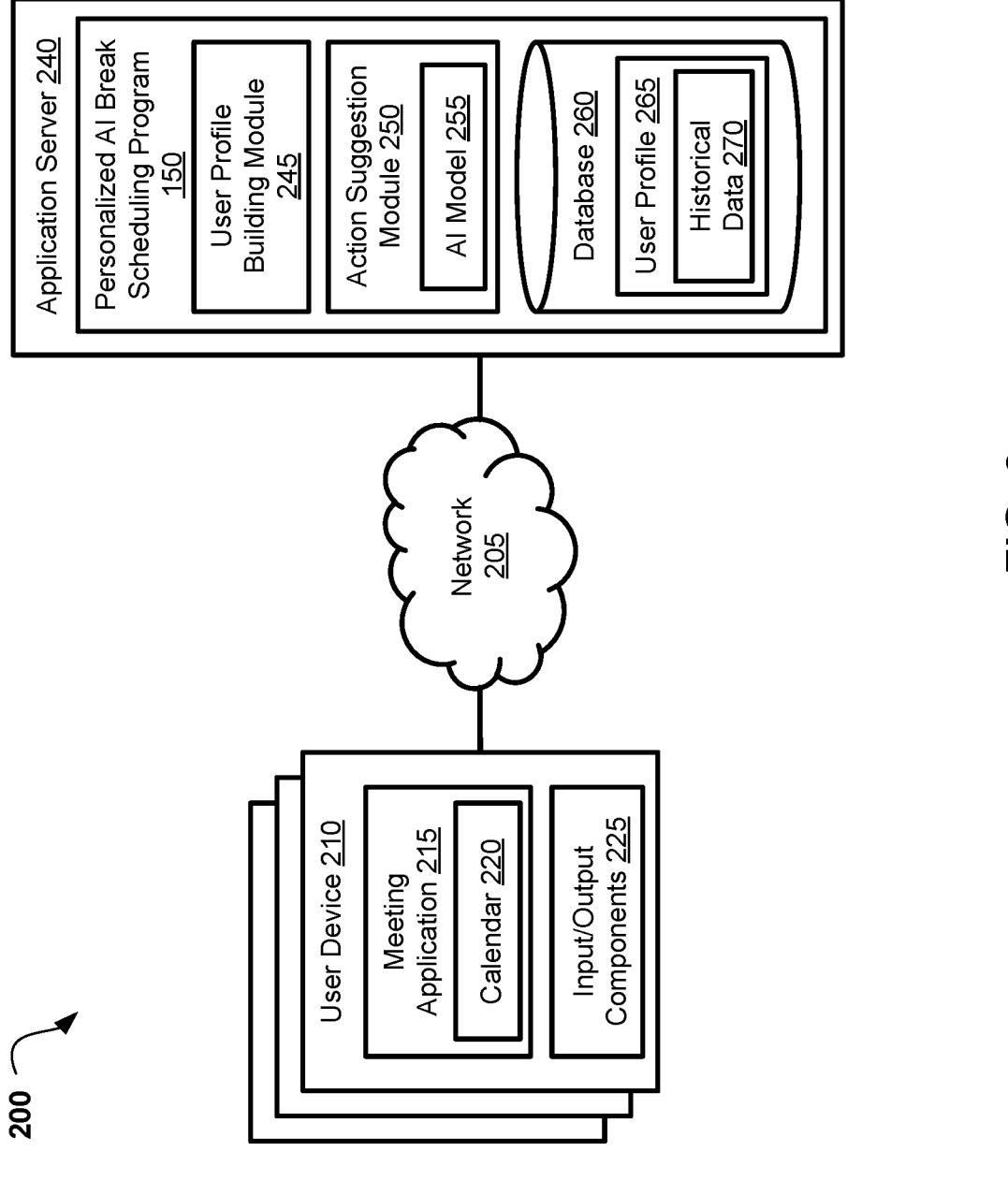
FIG. 2 illustrates a functional block diagram of a component architecture according to at least one embodiment.

Referring now to FIG. 2, a function block diagram of a networking architecture 200 is depicted, which includes components for a personalized AI break scheduler to improve user mental and physical health and increase user focus, concentration, and productivity, according to one or more embodiments. The networking architecture 200 may include one or more user devices 210 connected to an application server 240 over a wired and/or wireless network 205. The wired and/or wireless network 205 may be any communication protocol that allows data to be transferred between components of the system (e.g., PCIe, I2C, Bluetooth, Wi-Fi, cellular (e.g., 3G, 4G, 5G), Ethernet, fiber optic, etc.).

User device 210 may include any device (e.g., laptop, desktop tablet mobile phone, etc.) that allows users to interact with their calendar and participate in meetings and is comprised of meeting application 215 and input/output components 225.

Meeting application 215 may be a web conferencing application (e.g., Cisco Webex® (Webex and all Webex-based trademarks and logos are trademarks or registered trademarks of Webex Communications, Inc. and/or its affiliates), Zoom® (Zoom and all Zoom-based trademarks and logos are trademarks or registered trademarks of Zoom Video Communications Inc. and/or its affiliates), Microsoft Teams® (Teams and all Teams-based trademarks and logos are trademarks or registered trademarks of Microsoft Corporation and/or its affiliates), Skype® (Skype and all Skype-based trademarks and logos are trademarks or registered trademarks of Microsoft Corporation and/or its affiliates), GoToMeeting® (GoToMeeting and all GoToMeeting-based trademarks and logos are trademarks or registered trademarks of Citrix Online, LLC. and/or its affiliates), and FaceTime® (Facetime and all Facetime-based trademarks and logos are trademarks or registered trademarks of Apple Inc. and/or its affiliates)) that allows user to interact in meetings; participant in text communications, audio communications, video communications, or any combination thereof; and interact with user calendar 220.

Calendar 220 may allow the user to view their existing, scheduled meetings, set up new meetings, and accept/decline meetings. Calendar 220 may also send data to personalized AI break scheduling program 150 and accept inputs to add personalized breaks in the user's schedule. In one or more embodiments, application programing interfaces (APIs) may be used to extract a user's calendar information from another program or application.

Input/output components 225 may be tools built into user device 210 or peripheral devices, such as peripheral device set 114, connected to user device 210 that allow auditory and visual data to be transmitted and received. Additionally, input/output components 225 may include, but are not limited to, speakers, microphones, cameras, sensors (e.g., movement, heartrate, etc. tracked with connected wearable electronics such as in IoT sensor set 125), displays, etc. Furthermore, input data (e.g., speech, facial expressions, eye tracking, motion, use of other applications during a meeting, etc.) captured by input/output components 225 may be utilized by user profile building module 245. In one or more embodiments, a user may opt in or agree to be monitored for their own benefit to mental and physical health according to the opt-in procedure previously described.

Application server 240 may be a backend server that supports meeting application 215 allowing users to participate in virtual meetings and also includes the additional modules utilized by personalized AI break scheduling program 150 that auto-schedule personalized breaks which include user profile building module 245, action suggestion module 250, and database 260.

User profile building module 245 may receive input data from a user's calendar 220 and input data from input/output components 225 (on a user-by-user basis) to one or more arrays that include parameters that identify the state of a user at different times during a block of multiple consecutive meetings. In one or more embodiments, audio analysis and/or natural language processing (NLP) on a meeting transcript can be used to extract information about the user's participation in meetings as time progresses through a meeting block to determine changes in speech rate (e.g., words per minute), speech quality (e.g., slurring words), memory recollection, filler words used (e.g., "um", "let me think", etc.), response speed, etc. The user profile building module 245 may represent each piece of extracted NLP by a parameter in the one or more arrays.

In one or more other embodiments, visual recognition and/or sensors can be trained to extract tags for visual cues about the user's participation in meetings as time progresses through a meeting block including eye tracking, decreased movement, head nodding, decreased focus on the screen of the user device 210, etc. Furthermore, the user profile building module 245 may represent each visual recognition tag as a parameter in the one or more arrays. Additional parameters that may be considered include, but are not limited to, distractions by other programs operating on user device 210, time of day of the meeting block, day of the week of the meeting block, meeting topic (e.g., status meeting, development/design meeting, etc.), and simultaneous use of other programs on a user device by the user.

In one or more embodiments, an array may be generated for a preset amount of time (e.g., once every five minutes, once every 15 minutes, once during a meeting, etc.).

Furthermore, a fatigue weight may be assigned to an array for live meeting analysis based on the values provided for each parameter to indicate a level of tiredness/fatigue for the user of user device 210, which could impact one's mental and physical health in a negative way and decrease focus, concentration, and productivity. In one or more embodiments, a user may provide supervised input to indicate their level of tiredness or agree/disagree with the assigned value for continuous system improvement. In one or more other embodiments, unsupervised learning may be utilized based on analysis of input/output components 225 recognizing less user movement, less user interaction within a meeting, head nodding, increased blinking rate, user walking away from their device, user slouching in their chair, etc.

Additionally, a duration weight may also be assigned to an array for use in comparison of future meetings to a user calendar based on the time into a meeting block with no break.

Action suggestion module 250 may receive input from a user profile and a user's calendar to suggest an action using AI model 255. In one or more embodiments, the action may be to schedule an automatic break on a user's calendar such that the time slot appears occupied to others scheduling future meetings. In one or more other embodiments, the action may be to notify the creator of a meeting that although a participant's calendar appears open at a certain time, that particular participant may be likely to be tired and another time slot would be more optimal. In yet other embodiments, action suggestion module 250 may run during a live meeting and the action can be to provide visual or audio cues to regain a user's attention when they show signs of being tired. Action suggestion module 250, and its operations as a part of personalized AI break scheduling program 150, is described further in FIG. 3.

AI model 255 may perform k-nearest neighbor analysis to average either the fatigue weight or duration weight of past arrays that are similar to a current situation to suggest an action if the average weight is above a threshold. In one or more embodiments, supervised learning may be provided by users to adjust weighting of arrays to improve future performance of AI model 255.

In one or more embodiments, database 260 may be a repository exemplified by storage 124 and/or remote database 130. Database 260 may contain data for all user profiles 265 and any training data for AI model 255.

User profile 265 may contain historical data 270 of arrays and associated weight created by user profile building module 245 and used by AI model 255, past input data from input/output components 225, the user's calendar 220, past outputs of AI model 255 specific to each user, supervised learning input provided by the user, etc.

Referring now to FIG. 3, an operational flowchart for a personalized AI break scheduling process 300 is depicted according to at least one embodiment. The personalized AI break scheduling process 300 may be initiated either during a live meeting or may be a routine scan of the user's calendar that may occur at a preconfigured period, such as once per hour, once per day, once per week, etc., or triggered when the user creates or receives a meeting invitation. At 302, the personalized AI break scheduling program 150 imports a user calendar. The personalized AI break scheduling program 150 may import the user calendar through a manual import of a calendar application-associated file by the user or through an application programming interface (API) that fetches updates to the user calendar either in real-time, when a change is made, or on a preconfigured period.

Then, at 304, the personalized AI break scheduling program 150 imports a user profile dataset. In at least one embodiment, similar to the importation of the user calendar in step 302, the personalized AI break scheduling program 150 may import the user profile dataset through either manual user upload or through an API fetch either in real-time or on a preconfigured period. In one or more embodiments, the dataset may include one or more arrays from previous meetings, the time correlation between those meetings (i.e., a number of consecutive meetings with no break, number of meetings per day, number of meetings per week, etc.), and a fatigue and duration weight.

Next, at 306, the personalized AI break scheduling program 150 determines whether a live meeting is ongoing. The personalized AI break scheduling program 150 may determine that a live meeting is ongoing based on an analysis of data transmission from and/or to the user device from a web conferencing application. Similarly, the personalized AI break scheduling program 150 may determine a live meeting is ongoing if the user has interacted with a "Join Meeting"-type button on a graphical user interface of a web conferencing application. If the personalized AI break scheduling program 150 determines a live meeting is ongoing (step 306, "Yes" branch), then the personalized AI break scheduling process 300 may proceed to step 310 to import live data from the user device. If the personalized AI break scheduling program 150 determines a live meeting is not ongoing (step 306, "No" branch), then the personalized AI break scheduling process 300 may proceed to step 308 to analyze the calendar and user profile.

Then, at 308, the personalized AI break scheduling program 150 analyzes calendar and user profile data. If the personalized AI break scheduling program 150 determines that a live meeting is not ongoing, the personalized AI break scheduling program 150 may analyze the imported user calendar and user profile imported in steps 302 and 304, respectively, to determine the user's current work schedule, whether a block of meetings exist, whether scheduled breaks already exist, and/or whether open slots are present in the user's calendar that may allow for the additional of breaks to be added. The personalized AI break scheduling program 150 may perform such an analysis when a routine scan of the user's calendar was performed or if triggered when the user creates or receives a meeting invitation.

Next, at 310, the personalized AI break scheduling program 150 imports live data from a user device. If the personalized AI break scheduling program 150 determines a live meeting is ongoing, the personalized AI break scheduling program 150 may import live data from the user device for a current ongoing meeting. The personalized AI break scheduling program 150 may utilize data captured from input/output components 225 to effectuate the import of the live data. The extracted user device data may contain audio captured through a microphone, video captured through a camera, and/or data from sensors within IoT sensor set 125 (e.g., movement, heartrate, etc., tracked with connected wearable electronics).

Then, at 312, the personalized AI break scheduling program 150 generates or updates an array from the imported live data. In one or more embodiments, the array, or fatigue array, may be a multiparameter array from the various items of imported live data previously described. Additionally, the parameters in the multiparameter array may be determined using natural language processing, visual recognition, and/or direct sensor input. The personalized AI break scheduling program 150 may perform array generation/updating and fatigue weighting using the user profile building module 245. The arrays generated or updated by the personalized AI break scheduling program 150 may be generated or updated for each participant of a live meeting.

Next, at 314, the personalized AI break scheduling program 150 performs k-nearest neighbor analysis between current data and the user dataset. The personalized AI break scheduling program 150 may utilize Euclidean distance measurements between the live data array and the nearest neighbors in the dataset. The Euclidean distance measurements may be made using a subset of the array parameters based on which branch was taken in step 306. For example, if the "No" branch in step 306 was traversed, there will be no audio or visual data to compare to the user profile so those parameters can be ignored in the distance calculation.

Furthermore, the variable k from k-nearest neighbor analysis can be set based on implementation, such as three nearest neighbors, five nearest neighbors, etc. Each of the nearest neighbor arrays may contain weights and those respective weights can be averaged between the k-nearest neighbors. If the "Yes" branch of step 306 was traversed, the personalized AI break scheduling program 150 may utilize the fatigue weights. However, if the "No" branch of step 306 was traversed, the personalized AI break scheduling program 150 may utilize the duration weights.

Then, at 316, the personalized AI break scheduling program 150 determines whether an action needs to be performed based on an analysis of the k-nearest neighbors. The personalized AI break scheduling program 150 may calculate the average weight for one or more actions from the nearest neighbors and, subsequently, initiate one or more actions if the average weight exceeds a threshold. If the personalized AI break scheduling program 150 determines an action needs to be performed based on an analysis of the k-nearest neighbors (step 316, "Yes" branch), then the personalized AI break scheduling process 300 may proceed to step 318 to perform the action and log the action to a user profile. If the personalized AI break scheduling program 150 determines an action does not need to be performed based on an analysis of the k-nearest neighbors (step 316, "No" branch), then the personalized AI break scheduling process 300 may proceed to step 320 to determine whether the meeting is currently ongoing.

Next, at 318, the personalized AI break scheduling program 150 performs the action and logs the action in the user profile. If the personalized AI break scheduling program 150 determines an action does need to be performed in step 316, the personalized AI break scheduling program 150 may proceed with performing the action. Actions suggested may include, but are not limited to, adding a break to the user's calendar, determining the duration of the break, informing the creator of a meeting that one or more users have not had a break for a preconfigured threshold number of hours prior to the currently selected new meeting time, notifying the user to stand up or move around during an ongoing meeting, playing a sound to alert the user in an attempt to get them to refocus on the meeting, etc. Some of the actions suggested may only apply during live meetings (i.e., when the "Yes" branch was taken at 306) and others may apply during the periodic checks or when triggered due to a meeting invite/creation (i.e., when the "No" branch was taken at 306).

In one or more embodiments, the personalized AI break scheduling program 150 may transmit a notification to the user before the action is performed such that the user can confirm or deny the action before it is taken. The personalized AI break scheduling program 150 may use the information provided by the user as supervised input for continuous improvement of AI model 255.

In one or more other embodiments, the personalized AI break scheduling program 150 may omit recordation of the action in a log until the meeting has ended. Such a situation may be beneficial when the user ultimately decides to undo an action.

In yet another embodiment, the personalized AI break scheduling program 150 may log tiredness trends along with any actions performed. A tiredness trend may be recognized from supervised user input or unsupervised learning form analysis of cameras, microphones, and/or other items within IoT sensor set 125 recognizing less user movement, less user interaction within a meeting, head nodding, increased blinking rate, user walking away from their device, user slouching in their chair, etc.

In further embodiments, during periodic checks, the personalized AI break scheduling program 150 may utilize array duration weights by comparing to the time of a meeting block and, if the average of the corresponding fatigue weights exceed a tiredness/fatigue threshold, an action can be taken to auto-schedule a break on the user's calendar after the current meeting block.

Then, at 320, the personalized AI break scheduling program 150 determines whether a meeting is ongoing. The personalized AI break scheduling program 150 may determine that a meeting is still ongoing based on review of a user's calendar that details the start time and end time of a meeting. If the meeting is a virtual meeting, the personalized AI break scheduling program 150 may determine that a meeting is still ongoing if audio and/or video data is being transmitted and/or received from a web conferencing application. If the personalized AI break scheduling program 150 determines a meeting is ongoing (step 320, "Yes" branch), then the personalized AI break scheduling process 300 may return to step 310 to import live data from the user device. If the personalized AI break scheduling program 150 determines the meeting is no longer ongoing (step 320, "No" branch), then the personalized AI break scheduling process 300 may proceed to step 322 to receive supervised learning data from the user.

Next, at 322, the personalized AI break scheduling program 150 receives supervised learning data from a user. If the meeting is no longer in progress or in session, the personalized AI break scheduling program 150 may receive and prepare supervised learning data from a user. For example, the user may be prompted with a pop-up window after a meeting's conclusion if a sensor within IoT sensor set 125 (e.g., a camera or a microphone) detected tiredness (e.g., eyes closing, yawning, inattentiveness, etc.) where the user can respond in the affirmative or in the negative. The personalized AI break scheduling program 150 may then utilize supervised learning based on the user's responses to train its learning model on whether the user was indeed tired or fatigued and may have benefited from a break. In one or more embodiments, the personalized AI break scheduling program 150 may adjust the fatigue weight based on the supervised learning input.

Then, at 324, the personalized AI break scheduling program 150 adds a weighted array to the user profile. At the conclusion of a meeting, the personalized AI break scheduling program 150 may add the latest weighted array to the user profile. In one or more embodiments where the personalized AI break scheduling process 300 was triggered by a routine check or meeting creation/invite, then no array may exist to add to the user profile and the personalized AI break scheduling process 300 may terminate.

It may be appreciated that FIGS. 2 and 3 provide only an illustration of one implementation and do not imply any limitations with regard to how different embodiments may be implemented. Many modifications to the depicted environments may be made based on design and implementation requirements.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method, the method comprising:

receiving calendar data associated with a user and input data, captured by input/output components communicatively-coupled to a user device, associated with a current user fatigue condition, wherein the input data comprises auditory and visual data transmitted and received by the input/output components;

generating a current fatigue array based on the calendar data and the input data;

comparing array weights of the current fatigue array to user-specific array weights of a weighted fatigue array in a user profile associated with the user, wherein a comparison is performed using an artificial intelligence model by calculating a distance between the current fatigue array and k-nearest neighbors within a weighted fatigue array of the user profile, and wherein array weights for the k-nearest neighbors are averaged;

in response to the averaged array weights exceeding a user-specific fatigue threshold and a correlation between the calendar or the fatigue array and the user profile exceeding a threshold, executing a sound file on the user device and through the input/output components that refocuses the user to a current meeting; and updating the user profile to include the fatigue array.

2. The method of claim 1, wherein the fatigue array is a multiparameter array, and wherein one or more parameters of the multiparameter array are selected from a group consisting of speech rate, speech quality, memory recollection, fill er words used, response speed, eye movement, body movement, head nodding, focus, time of day of a meeting block, day of week of the meeting block, meeting topic, and simultaneous use of other programs on the user device by the user.

3. The method of claim 2, wherein values of the one or more parameters are determined using natural language processing, visual recognition, or direct sensor input.

4. The method of claim 2, wherein a fatigue weight is assigned to the fatigue array based on values of the one or more parameters to indicate a level of fatigue.

5. The method of claim 2, wherein a duration weight is assigned to the fatigue array based on a time into a meeting block with no break.

6. The method of claim 1, wherein the comparison is performed using an artificial intelligence model by calculating a distance between a current fatigue array and k-nearest neighbors within a model of the user profile, and wherein array weights for the k-nearest neighbors are averaged.

7. A computer system, the computer system comprising:

one or more processors, one or more computer-readable memories, one or more computer-readable tangible storage media, and program instructions stored on at least one of the one or more tangible storage media for execution by at least one of the one or more processors via at least one of the one or more memories, wherein the computer system is capable of performing a method comprising:

receiving calendar data associated with a user and input data, captured by input/output components communicatively-coupled to a user device, associated with a current user fatigue condition, wherein the input data comprises auditory and visual data transmitted and received by the input/output components;

generating a current fatigue array based on the calendar data and the input data;

comparing array weights of the current fatigue array to user-specific array weights of a weighted fatigue array in a user profile associated with the user, wherein a comparison is performed using an artificial intelligence model by calculating a distance between the current fatigue array and k-nearest neighbors within a weighted fatigue array of the user profile, and wherein array weights for the k-nearest neighbors are averaged;

in response to the averaged array weights exceeding a user-specific fatigue threshold and a correlation between the calendar or the fatigue array and the user profile exceeding a threshold, executing a sound file on the user device and through the input/output components that refocuses the user to a current meeting; and updating the user profile to include the fatigue array.

8. The computer system of claim 7, wherein the fatigue array is a multiparameter array, and wherein one or more parameters of the multiparameter array are selected from a group consisting of speech rate, speech quality, memory recollection, filler words used, response speed, eye movement, body movement, head nodding, focus, time of day of a meeting block, day of week of the meeting block, meeting topic, and simultaneous use of other programs on the user device by the user.

9. The computer system of claim 8, wherein values of the one or more parameters are determined using natural language processing, visual recognition, or direct sensor input.

10. The computer system of claim 8, wherein a fatigue weight is assigned to the fatigue array based on values of the one or more parameters to indicate a level of fatigue.

11. The computer system of claim 8, wherein a duration weight is assigned to the fatigue array based on a time into a meeting block with no break.

12. The computer system of claim 7, wherein the comparison is performed using an artificial intelligence model by calculating a distance between a current fatigue array and k-nearest neighbors within a model of the user profile, and wherein array weights for the k-nearest neighbors are averaged.

13. A computer program product, the computer program product comprising:

one or more computer-readable tangible storage media and program instructions stored on at least one of the one or more tangible storage media, the program instructions executable by a processor capable of performing a method, the method comprising:

receiving calendar data associated with a user and input data, captured by input/output components communicatively-coupled to a user device, associated with a current user fatigue condition, wherein the input data comprises auditory and visual data transmitted and received by the input/output components;

generating a current fatigue array based on the calendar data and the input data;

comparing array weights of the current fatigue array to user-specific array weights of a weighted fatigue array in a user profile associated with the user, wherein a comparison is performed using an artificial intelligence model by calculating a distance between the current fatigue array and k-nearest neighbors within a weighted fatigue array of the user profile, and wherein array weights for the k-nearest neighbors are averaged;

in response to the averaged array weights exceeding a user-specific fatigue threshold and a correlation between the calendar or the fatigue array and the user profile exceeding a threshold, executing a sound file on the user device and through the input/output components that refocuses the user to a current meeting; and updating the user profile to include the fatigue array.

14. The computer program product of claim 13, wherein the fatigue array is a multiparameter array, and wherein one or more parameters of the multiparameter array are selected from a group consisting of speech rate, speech quality, memory recollection, filler words used, response speed, eye movement, body movement, head nodding, focus, time of day of a meeting block, day of week of the meeting block, meeting topic, and simultaneous use of other programs on the user device by the user.

15. The computer program product of claim 14, wherein values of the one or more parameters are determined using natural language processing, visual recognition, or direct sensor input.

16. The computer program product of claim 14, wherein a fatigue weight is assigned to the fatigue array based on values of the one or more parameters to indicate a level of fatigue.

17. The computer program product of claim 14, wherein a duration weight is assigned to the fatigue array based on a time into a meeting block with no break.

18. The computer program product of claim 13, wherein the comparison is performed using an artificial intelligence model by calculating a distance between a current fatigue array and k-nearest neighbors within a model of the user profile, and wherein array weights for the k-nearest neighbors are averaged.

* * * * *